(12) United States Patent
Graf

(10) Patent No.: US 11,215,151 B2
(45) Date of Patent: Jan. 4, 2022

(54) EMERGENCY OPERATION METHOD FOR ACTUATING A FUEL PUMP

(71) Applicant: Vitesco Technologies GmbH, Hannover (DE)

(72) Inventor: Rolf Graf, Glashütten (DE)

(73) Assignee: Vitesco Technologies GmbH, Hannover (DE)

( * ) Notice: Subject to any disclaimer, the term of this patent is extended or adjusted under 35 U.S.C. 154(b) by 16 days.

(21) Appl. No.: 16/623,533

(22) PCT Filed: Jun. 18, 2018

(86) PCT No.: PCT/EP2018/066089
§ 371 (c)(1),
(2) Date: Dec. 17, 2019

(87) PCT Pub. No.: WO2018/234228
PCT Pub. Date: Dec. 27, 2018

(65) Prior Publication Data
US 2020/0141374 A1    May 7, 2020

(30) Foreign Application Priority Data
Jun. 22, 2017  (DE) .................... 10 2017 210 503.8

(51) Int. Cl.
*F02M 37/08* (2006.01)
*F02D 41/30* (2006.01)
(Continued)

(52) U.S. Cl.
CPC ........... *F02M 37/08* (2013.01); *B60K 15/077* (2013.01); *F02D 41/3082* (2013.01);
(Continued)

(58) Field of Classification Search
CPC ............... F02M 37/07; F02M 37/0076; F02M 2037/085; B60K 15/077;
(Continued)

(56) References Cited

U.S. PATENT DOCUMENTS 5,237,975 A * 8/1993 Betki .................. F02D 41/3082
123/456
5,313,923 A    5/1994 Takeuchi et al.
(Continued)

FOREIGN PATENT DOCUMENTS

DE        4446277      6/1996
DE      102011015154    9/2012
(Continued)

OTHER PUBLICATIONS

Office Action for the corresponding German Patent Application No. 10 2017 210 503.8.
(Continued)

*Primary Examiner* — George C Jin
(74) *Attorney, Agent, or Firm* — Cozen O'Connor

(57) ABSTRACT

An emergency operation method for actuating a fuel pump after a first temperature threshold for an actuation electronics system of the fuel pump has been exceeded including reducing a power consumption of an electric motor that drives a pump stage by the actuation electronics system by reducing a rotational speed until a monitored temperature value falls below a second temperature threshold below the first temperature threshold. Emergency operation method is initiated after the first temperature threshold is exceeded by a fault signal output by the actuation electronics system to an engine control unit is communicatively connected to the actuation electronics system. The fault signal, as long as it is output, is used to suppress a specification for the rotational speed of the electric motor on the part of the engine control unit and instead to specify the rotational speed by way of the actuation electronics system.

11 Claims, 1 Drawing Sheet

(51) Int. Cl.
*B60K 15/077* (2006.01)
*F02M 37/00* (2006.01)
*B60K 15/03* (2006.01)

(52) U.S. Cl.
CPC . *F02M 37/0076* (2013.01); *B60K 2015/0319* (2013.01); *F02M 2037/085* (2013.01)

(58) Field of Classification Search
CPC ......... B60K 2015/0319; F02D 41/3082; F02D 41/221; F02D 2200/50; F04B 2203/0205; F04B 2203/0209; F02B 49/06
See application file for complete search history.

(56) References Cited

U.S. PATENT DOCUMENTS

| | | | |
|---|---|---|---|
| 6,088,631 | A | 7/2000 | Kuehn et al. |
| 6,708,671 | B1 * | 3/2004 | Joos .................. F02D 41/1401 123/464 |
| 2016/0252032 | A1 | 9/2016 | Graf et al. |
| 2017/0204803 | A1 * | 7/2017 | Pursifull ............... F02D 41/123 |
| 2017/0253246 | A1 * | 9/2017 | Graf .................. B60W 30/1884 |
| 2019/0293017 | A1 * | 9/2019 | Ulrey .................. F02D 19/0684 |

FOREIGN PATENT DOCUMENTS

| | | |
|---|---|---|
| DE | 102012017675 | 3/2014 |
| DE | 102015201315 | 2/2016 |
| FR | 2876741 | 4/2006 |
| WO | WO 2007031463 | 3/2007 |
| WO | WO 2016/087543 | 6/2016 |

OTHER PUBLICATIONS

Office Action dated Oct. 9, 2021 issued in Chinese Patent Application No. 201880034202.4.

* cited by examiner

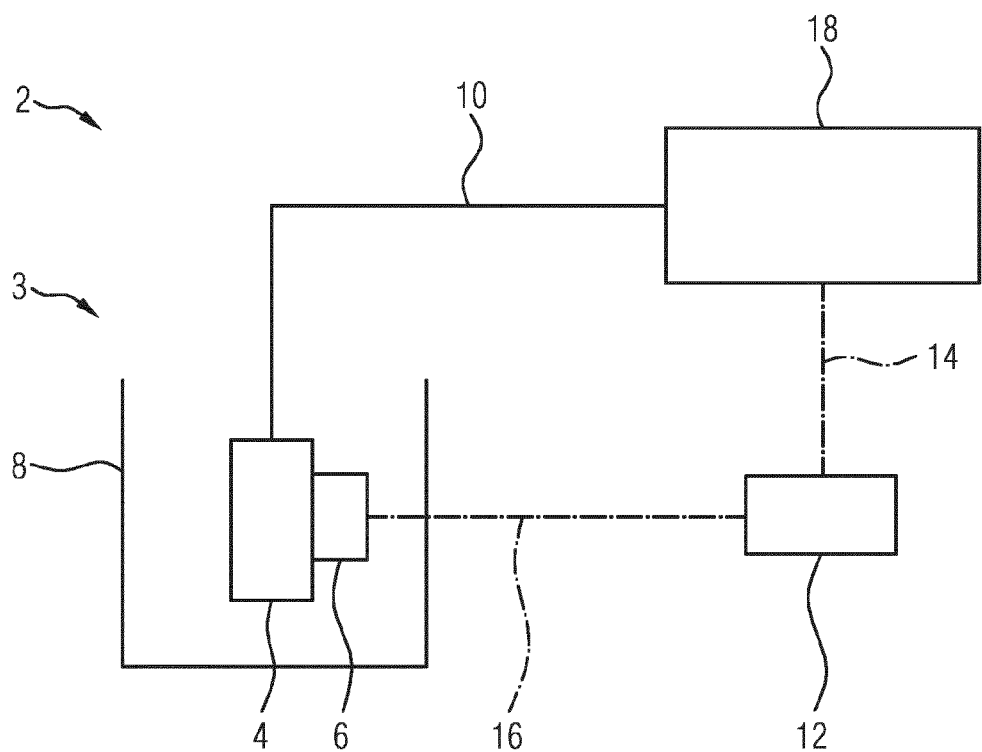

EMERGENCY OPERATION METHOD FOR ACTUATING A FUEL PUMP

CROSS REFERENCE TO RELATED APPLICATIONS

This is a U.S. national stage of Application No. PCT/EP2018/066089 filed Jun. 18, 2018. Priority is claimed on German Application No. DE 10 2017 210 503.8 filed Jun. 22, 2017 the content of which is incorporated herein by reference.

BACKGROUND OF THE INVENTION

1. Field of the Invention

The invention relates to an emergency operation method for actuating a fuel pump to avoid thermal overloading of an actuation electronics system of the fuel pump. The invention further relates to a computer program for carrying out a method, to a computer program product, and also to a vehicle having such a computer program.

2. Description of the Prior Art

Modern cars and commercial vehicles have a variety of actuators to perform different tasks, for instance to adjust valves, to regulate the flow of liquids, to operate pumps for pressure build-up, for example in braking and steering systems, or to deliver fuel and the like. In this case, actuators form an essential part of electronic regulation systems. Their task is also to convert the electrical signals of a control unit for instance of an engine control unit into an action. The actuators are usually electric motors or electromagnetic valves, which also have their own electronics module, which is connected to a central control unit, for instance the engine control unit. Such electronics modules are also referred to as electronic power controllers.

In the following text, reference is made to an electronics module or an actuation electronics system of a fuel pump for rotational speed regulation or pressure regulation of a pump stage operated by electric motor, which pump stage, together with an electric motor that drives said pump stage, in addition to the electronics module, belongs to the fuel pump.

For reasons of cost, the electronics module or the actuation electronics system are so tightly designed that a defined operation under defined environmental conditions is just possible without thermal overloading. Defined operation can be understood here to mean, for example, a continuous operation at maximum load and maximum temperature or a defined driving profile with load states defined over a period.

The tight design of the electronics system driven by costs leads to the maximum permissible temperature thereof being reached relatively quickly. However, thermal overloading can be avoided in the normal case while adhering to boundary conditions, estimated during development by way of an appropriate design, which is to be understood as a structural design and a corresponding arrangement of the electronics system in the vehicle. Nevertheless, under certain conditions, the maximum permissible temperature may be exceeded and, as a result, thermal overloading may occur, leading in the worst case to the destruction of the electronics system.

SUMMARY OF THE INVENTION

It is an object of one aspect of the present invention to counteract such a fault event and to avoid thermal overloading of the electronics system.

One aspect of the present invention provides protection for an emergency operation method for actuating a fuel pump after a first temperature threshold for an actuation electronics system of the fuel pump has been exceeded by a monitored temperature value of the actuation electronics system.

The first temperature threshold is to be understood here as a critical temperature threshold, the exceeding of which is able to be tolerated only temporarily without thermally related destruction of the actuation electronics system occurring. However, the time until destruction is dependent on the aforementioned design.

According to one aspect of the emergency operation method, a power consumption of an electric motor that drives a pump stage is reduced by way of the actuation electronics system by reducing the rotational speed until the monitored temperature value falls below a second temperature threshold, which is below the first temperature threshold.

In contrast, the second temperature threshold is to be understood here as a temperature threshold with an applied safety limit up to which a continuous operation of the actuation electronics system without thermal overloading is possible.

In this case, the emergency operation method is initiated after the first temperature threshold is exceeded by virtue of a fault signal being output by the actuation electronics system to an engine control unit of an internal combustion engine, which engine control unit is communicatively connected to the actuation electronics system. In this case, the fault signal, as long as it is output, is used to suppress a specification for the rotational speed of the electric motor on the part of the engine control unit and instead to autonomously specify the rotational speed by way of the actuation electronics system.

By way of the method, thermal overloading and concomitant destruction of the actuation electronics system of the fuel pump can be avoided by virtue of the rotational speed reduction being carried out in the event of a fault—that is to say after the first temperature threshold of the actuation electronics system has been exceeded by the monitored temperature value of the actuation electronics system—until the monitored temperature value falls below the first temperature threshold again, possibly taking into account temporal debouncing that is to be defined, which is to be understood as temporal blocking out after withdrawal of the fault message by the actuation electronics system.

According to one aspect of the invention, as long as the fault signal is output, the rotational speed specified by the engine control unit is suppressed as long as it is above the specification of the actuation electronics system. In this case, the rotational speed specified by the engine control unit can be followed when it is below the specification of the actuation electronics system. Since then the specification by the engine control unit would further favor the cooling of the actuation electronics system.

According to one aspect of the invention, the rotational speed specified by the engine control unit, as long as it is above an instantaneous rotational speed value of the electric motor, is only followed again when the second temperature threshold is undershot. In the meantime, the rotational speed specification of the actuation electronics system is followed. In this case, the instantaneous rotational speed value of the electric motor can be retained as long as a new rotational speed value is not specified by the actuation electronics system and as long as the second temperature threshold of the actuation electronics system is not undershot.

According to one aspect of the invention, a fault memory input is generated in the engine control unit with the output of the fault signal. A decrease in the rotational speed of the order of magnitude of 600 to 3000 rpm can be prompted with the output of the fault signal.

According to one aspect of the invention, the fuel pump can be deactivated when a third temperature threshold, which is above the first temperature threshold, is exceeded.

The third temperature threshold is to be understood here as a destruction threshold that is even more critical compared to the first temperature threshold, the exceeding of the destruction threshold even for a briefer time leading to the destruction of the actuation electronics system.

A computer program for carrying out the method described above, as well as a computer program product are also proposed.

A motor vehicle having an engine control unit for controlling and regulating an internal combustion engine and a fuel pump having an actuation electronics system, which is communicatively connected to the engine control unit, is also proposed. The actuation electronics system in this case comprises storage means having a computer program stored thereon, wherein the computer program is designed to carry out the method described above.

BRIEF DESCRIPTION OF THE DRAWINGS

The invention will be discussed in detail below with reference to a single FIGURE. Further advantageous refinements of the invention arise from the dependent claims and the description below of preferred embodiments. To this end, in the FIGURES:

The FIGURE is a schematic illustration of an internal combustion engine and a fuel delivery system for supplying the internal combustion engine.

DETAILED DESCRIPTION OF THE PRESENTLY PREFERRED EMBODIMENTS

The FIGURE illustrates a fuel delivery system 2 having a fuel delivery unit 3 for supplying fuel to an internal combustion engine 18. The fuel delivery unit in this case comprises a fuel pump or a fuel delivery assembly 4 having an actuation electronics system 6, which can be arranged either inside or outside of a fuel pump housing. The fuel pump 4 is in this case arranged inside a swirl pot 8, which is arranged inside a fuel tank. The fuel pump 4 comprises an electric motor and a pump stage, which is driven by the electric motor and delivers the fuel in the swirl pot to the internal combustion engine 18 via a supply line 10. The internal combustion engine 18 is communicatively connected 14 to an engine control unit 12, including a processor and memory, which controls and regulates the internal combustion engine. The engine control unit 12 is also communicatively connected 16 to the fuel pump 4 in order to control and regulate the same.

The power consumption and the supply current of the fuel pump 4 are directly dependent on the pressure in the pump stage in the case of a constant rotational speed. The losses in the actuation electronics system 6 are dependent on the power consumption and the supply current provided at an operating point. If the supply current increases, the losses increase and therefore the temperature in the actuation electronics system 6 also increases.

In the event of a fault in the fuel delivery system 2, the temperature of the actuation electronics system 6 increases. Such a fault event may have different causes. For example, a bent line or a dirty filter can lead to a pressure increase in the pump stage. In this case, the operating current of the fuel pump 4 increases, which exceeds the specified values. Contamination of the actuation electronics system 6 may also be the cause for the temperature increase and also an unpredicted high temperature in the environment of the actuation electronics system 6, which as such prevents heat dissipation to the environment. All of these conditions can lead to a temperature monitored with respect to the actuation electronics system 6 exceeding a threshold or limit temperature that is to be defined. In the context of this disclosure, a fault event is present only when the monitored temperature exceeds the threshold or limit temperature.

The threshold or limit temperature to be defined is a first critical temperature threshold upon the exceeding of which a fault signal is output by the actuation electronics system 6 to the engine control unit 12. A corresponding fault memory input can then be generated in the engine control unit 12 with the output of the fault signal. In addition thereto, a corresponding indication can also be output to a vehicle driver, for instance via an instrument cluster, wherein the indication is intended to prompt the vehicle driver to visit a workshop.

Since the temperature of the actuation electronics system 6 is monitored either by sensors and/or in a model-based manner the engine control unit 12 can react in good time to a corresponding rise in temperature by virtue of it taking corresponding countermeasures to reduce the power consumption of the fuel pump 4. The rotational speed specification on the part of the engine control unit 12 then changes to the actuation electronics system 6 accordingly. Otherwise, said fault event may arise. The onset of the fault event, which is associated with an output of the fault signal by the actuation electronics system 6 to the engine control unit 12, initiates the emergency operation method according to one aspect of the invention. Even after the onset of the fault event, the rotational speed is further specified by the engine control unit 12. However, as long as the fault signal is output, the rotational speed specification is only taken into account to a limited extent. In detail, the emergency operation method according to the invention is presented as follows:

With the onset of the fault event, the power consumption of the electric motor that drives the pump stage is reduced by way of the actuation electronics system 6 by reducing the rotational speed until the monitored temperature value falls below a second temperature threshold, which is below the first temperature threshold. As long as the fault signal is output, the rotational speed specification is suppressed or blocked out on the part of the engine control unit and instead the rotational speed is specified autonomously by the actuation electronics system 6. The rotational speed can in this case be decreased in the order of magnitude of 600 to 3000 rpm. The decrease in rotational speed can in this case be prompted by a rotational speed regulation or pressure regulation of the fuel pump.

According to one aspect, the critical first temperature threshold can be set so that it is actually below what is known as a destruction threshold or third critical temperature threshold. This leads to a certain level of protection against too rapid a destruction of the actuation electronics system 6 after the first temperature threshold has been exceeded.

As long as the fault signal is output, the rotational speed specified by the engine control unit 12 is suppressed or blocked out as long as it is above the specification of the actuation electronics system 6. However, if the rotational speed specified by the engine control unit 12 is below the specification of the actuation electronics system 6, then it is followed. If the rotational speed specified by the engine control unit 12 is above an instantaneous rotational speed value of the electric motor, it is followed again only when the second temperature threshold is undershot and the fault output is no longer present.

According to a further aspect, the instantaneous rotational speed value of the electric motor can be retained as long as a new rotational speed value is not specified by the actuation electronics system 6 and as long as the second temperature threshold is not undershot.

According to a further aspect, when the aforementioned third temperature threshold, which is above the first temperature threshold, is exceeded, the fuel pump 4 can be deactivated immediately in order to ensure appropriate component protection.

In the simplest case, the first, second and third temperature threshold are specified by corresponding fixed values acting as reference values. However, load-point-dependent temperature characteristic curves or temperature characteristic maps can also be specified as reference values. In this case, the reference values can be stored either in the engine control unit 12 and/or in the actuation electronics system 6 itself.

In the normal case, that is to say at temperatures below the second temperature threshold, the full delivery quantity of fuel is provided by the fuel delivery system 2. In contrast, in the event of a fault, that is to say at temperatures above the second temperature threshold, a corresponding reduction in the delivery amount is prompted by the proposed emergency operation method, said reduction avoiding thermal overloading or a thermally induced destruction of the fuel pump.

The method described above and the advantageous embodiments can be implemented by software in the actuation electronics system 6.

In this case, the actuation electronics system 6 can have a digital microprocessor unit (CPU) connected in terms of data to a storage system and a bus system, a random access memory (RAM) and also a storage. The CPU is designed to execute commands, which are embodied as a program stored in a storage system, to detect input signals from the data bus and to output output signals to the data bus. The storage system can have various storage media in the form of magnetic, solid-state, and other non-volatile media on which a corresponding computer program for carrying out the method and the advantageous configurations is stored. The program may be such that it embodies or is capable of executing the methods described here so that the CPU can execute the steps of such methods and therefore control the fuel pump.

A computer program having program code suitable for carrying out a method in order to carry out all steps of each of the claims when the program is executed in the CPU.

The computer program can simply be read into an already existing actuation electronics system and can be used to control the fuel pump or the electric motor thereof.

For this purpose, a computer program product having program code means is provided, said program code being stored on a computer-readable data storage medium in order to carry out the method according to each of the claims when the program product is executed in the CPU. The computer program product can also be integrated into the actuation electronics system as a retrofitted option.

Although exemplary embodiments have been discussed in the above description, it should be noted that numerous modifications are possible. Furthermore, it should be noted that the exemplary embodiments are merely examples which are not intended to limit the scope of protection, applications and structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An emergency operation method to actuate a fuel pump, comprising:
   monitoring a temperature value of an actuation electronics system for the fuel pump;
   determining if a first temperature threshold of the actuation electronics system of the fuel pump has been exceeded;
   initiating the emergency operation method after the first temperature threshold is exceeded by outputting a fault signal by the actuation electronics system to an engine control unit of an internal combustion engine, which engine control unit is communicatively connected to the actuation electronics system; and
   reducing a power consumption of an electric motor that drives a pump stage by the actuation electronics system by reducing a rotational speed of the electric motor until the monitored temperature value falls below a second temperature threshold, which is below the first temperature threshold, after the emergency operation method is initiated;
   suppressing a specification for the rotational speed of the electric motor by the engine control unit due to the fault signal, as long as the fault signal is output; and
   specifying the rotational speed of the electric motor by the actuation electronics system when the specification for the rotational speed of the electric motor by the engine control unit is suppressed.

2. The method as claimed in claim 1, further comprising:
   suppressing the rotational speed of the electric motor specified by the engine control unit as long as the fault signal is output when the rotational speed of the electric motor specified by the engine control unit is above the rotational speed of the electric motor specified by the actuation electronics system.

3. An emergency operation method to actuate a fuel pump, comprising:
   monitoring a temperature value of an actuation electronics system for the fuel pump;

determining if a first temperature threshold of the actuation electronics system of the fuel pump has been exceeded;
initiating the emergency operation method after the first temperature threshold is exceeded by outputting a fault signal by the actuation electronics system to an engine control unit of an internal combustion engine, which engine control unit is communicatively connected to the actuation electronics system;
reducing a power consumption of an electric motor that drives a pump stage by the actuation electronics system by reducing a rotational speed of the electric motor until the monitored temperature value falls below a second temperature threshold, which is below the first temperature threshold, after the emergency operation method is initiated;
suppressing a specification for the rotational speed of the electric motor by the engine control unit due to the fault signal, as long as the fault signal is output;
specifying the rotational speed of the electric motor by the actuation electronics system when the specification for the rotational speed of the electric motor by the engine control unit is suppressed;
suppressing the rotational speed of the electric motor specified by the engine control unit as long as the fault signal is output when the rotational speed of the electric motor specified by the engine control unit is above the rotational speed of the electric motor specified by the actuation electronics system; and
following the rotational speed of the electric motor specified by the engine control unit when the rotational speed of the electric motor specified by the engine control unit is below the specification of the actuation electronics system.

4. The method as claimed in claim 3, further comprising:
following the rotational speed of the electric motor specified by the engine control unit, as long as the specified speed is above an instantaneous rotational speed value of the electric motor, only when the second temperature threshold is undershot.

5. The method as claimed in claim 4, wherein the instantaneous rotational speed value of the electric motor is retained as long as a new rotational speed value is not specified by the actuation electronics system and as long as the second temperature threshold is not undershot.

6. The method as claimed in claim 1, further comprising:
generating a fault memory input in the engine control unit with the output of the fault signal.

7. The method as claimed in claim 1, further comprising:
prompting a decrease in the rotational speed of the electric motor of an order of magnitude of 600 to 3000 rpm with the output of the fault signal.

8. The method as claimed in claim 1, further comprising:
deactivating the fuel pump a third temperature threshold, which is above the first temperature threshold, is exceeded.

9. A computer program for carrying out a method on a computer, comprising:
monitoring a temperature value of an actuation electronics system for the fuel pump;
determining if a first temperature threshold of the actuation electronics system of the fuel pump has been exceeded;
initiating the emergency operation method after the first temperature threshold is exceeded by outputting a fault signal by the actuation electronics system to an engine control unit of an internal combustion engine, which engine control unit is communicatively connected to the actuation electronics system; and
reducing a power consumption of an electric motor that drives a pump stage by the actuation electronics system by reducing a rotational speed of the electric motor until the monitored temperature value falls below a second temperature threshold, which is below the first temperature threshold, after the emergency operation method is initiated; and
suppressing a specification for the rotational speed of the electric motor by the engine control unit due to the fault signal, as long as the fault signal is output; and
specifying the rotational speed of the electric motor by the actuation electronics system when the specification for the rotational speed of the electric motor by the engine control unit is suppressed.

10. A computer program product, comprising program code, stored on a computer-readable data storage medium, wherein the program code are executed on a computer, causing the computer to:
monitor a temperature value of an actuation electronics system for the fuel pump;
determine if a first temperature threshold of the actuation electronics system of the fuel pump has been exceeded;
initiate the emergency operation method after the first temperature threshold is exceeded by outputting a fault signal by the actuation electronics system to an engine control unit of an internal combustion engine, which engine control unit is communicatively connected to the actuation electronics system; and
reduce a power consumption of an electric motor that drives a pump stage by the actuation electronics system by reducing a rotational speed of the electric motor until the monitored temperature value falls below a second temperature threshold, which is below the first temperature threshold, after the emergency operation method is initiated; and
suppress a specification for the rotational speed of the electric motor by the engine control unit due to the fault signal, as long as the fault signal is output; and
specify the rotational speed of the electric motor by the actuation electronics system when the specification for the rotational speed of the electric motor by the engine control unit is suppressed.

11. A motor vehicle having an engine control unit for controlling and regulating an internal combustion engine and a fuel pump by way of an actuation electronics system, which is communicatively connected to the engine control unit, wherein the actuation electronics system has storage having a computer program stored thereon, wherein the computer program is designed to:
monitor a temperature value of an actuation electronics system for the fuel pump;
determine if a first temperature threshold of the actuation electronics system of the fuel pump has been exceeded;
initiate the emergency operation method after the first temperature threshold is exceeded by outputting a fault signal by the actuation electronics system to an engine control unit of an internal combustion engine, which engine control unit is communicatively connected to the actuation electronics system; and
reduce a power consumption of an electric motor that drives a pump stage by the actuation electronics system by reducing a rotational speed of the electric motor until the monitored temperature value falls below a second temperature threshold, which is below the first temperature threshold, after the emergency operation method is initiated; and suppress a specification for the rotational speed of the electric motor by the engine control unit due to the fault signal, as long as the fault signal is output; and specify the rotational speed of the electric motor by the actuation electronics system when the specification for the rotational speed of the electric motor by the engine control unit is suppressed.

* * * * *